US008382419B2

(12) United States Patent
Agoncillo et al.

(10) Patent No.: US 8,382,419 B2
(45) Date of Patent: Feb. 26, 2013

(54) PORTABLE TANK LIFTING AND HANDLING APPARATUS

(75) Inventors: Cielito B. Agoncillo, Newtown, PA (US); W. Brian McGinty, Huntingdon Valley, PA (US); Michael P. Ziaylek, Yardley, PA (US)

(73) Assignee: Michael P. Ziaylek, Yardley, PA (US)

( * ) Notice: Subject to any disclaimer, the term of this patent is extended or adjusted under 35 U.S.C. 154(b) by 265 days.

(21) Appl. No.: 12/798,626

(22) Filed: Apr. 8, 2010

(65) Prior Publication Data

US 2010/0263967 A1 Oct. 21, 2010

Related U.S. Application Data

(60) Provisional application No. 61/214,147, filed on Apr. 20, 2009.

(51) Int. Cl.
*B60P 3/055* (2006.01)

(52) U.S. Cl. ......................... 414/546; 414/910; 414/917

(58) Field of Classification Search .................. 414/546, 414/555, 910, 917; 280/79.5
See application file for complete search history.

(56) References Cited

U.S. PATENT DOCUMENTS 1,827,209 A 10/1931 Robbins
1,896,249 A 2/1933 Russell
2,463,967 A 3/1949 Hefelfinger
2,500,055 A 3/1950 Baker
2,624,483 A 1/1953 Ketzel
2,730,257 A 1/1956 Stresau, Jr.
2,738,086 A 3/1956 Reich
2,903,147 A 9/1959 Davis, Jr.
2,905,347 A 9/1959 Hopfeld
3,471,046 A 10/1969 Hess
3,637,097 A 1/1972 Horowitz
3,682,342 A 8/1972 Evans
4,021,070 A 5/1977 Shea
4,059,281 A 11/1977 Evans
4,084,706 A * 4/1978 Russell ......................... 414/460
4,084,715 A * 4/1978 Stedman ....................... 414/629
4,205,937 A 6/1980 Fawley
4,221,529 A 9/1980 DeShano
4,318,661 A 3/1982 Helm
4,536,123 A 8/1985 Snyder
4,615,656 A 10/1986 Geraghty, Jr.
4,738,582 A 4/1988 Roberts
4,808,056 A 2/1989 Oshima
4,940,381 A 7/1990 Rysewyk
5,104,280 A 4/1992 Ziaylek et al.
5,145,311 A 9/1992 Salvucci
5,207,550 A 5/1993 Lehman
5,209,628 A 5/1993 Hassell
5,307,839 A 5/1994 Loebker et al.
5,340,136 A 8/1994 MacNeil et al.
5,344,278 A 9/1994 Emig, Jr.
(Continued)

*Primary Examiner* — Saul Rodriguez
*Assistant Examiner* — Jonathan Snelting
(74) *Attorney, Agent, or Firm* — Sperry, Zoda & Kane

(57) ABSTRACT

The apparatus of the present invention is designed to provide an apparatus for placement and removal of gas containing tanks in various locations for usage or transport. The apparatus includes a transport carriage assembly with wheels for moving thereof and a generally vertical beam with an angularly positioned reinforcing member for strengthening thereof. A parallel swing brace is pivotally connected to the vertical beam and extends outwardly therefrom. A tank retaining bracket assembly is secured to the outermost end of the parallel swing brace. Holding brackets and a foot plate are secured to the parallel swing braces and define a tank holding zone. A strap secures the tank to the retaining bracket. A drive is connected to the parallel swing brace to power movement thereof in a vertical direction either upwardly or downwardly as needed.

17 Claims, 13 Drawing Sheets

U.S. PATENT DOCUMENTS

| | | | | |
|---|---|---|---|---|
| 5,346,357 | A | 9/1994 | Hassell | |
| 5,366,338 | A | 11/1994 | Mortensen | |
| 5,440,098 | A | 8/1995 | Matus | |
| 5,518,357 | A | 5/1996 | Ziaylek | |
| 5,618,154 | A | 4/1997 | Irons, Jr. et al. | |
| 5,658,118 | A | 8/1997 | Luca | |
| 5,791,857 | A | 8/1998 | Ziaylek, Jr. et al. | |
| 5,944,474 | A | 8/1999 | Cummins et al. | |
| 5,984,612 | A | 11/1999 | Tatro | |
| 6,086,312 | A | 7/2000 | Ziaylek et al. | |
| 6,171,048 | B1 | 1/2001 | Grimes | |
| 6,368,048 | B2 | 4/2002 | Womble et al. | |
| 6,406,248 | B1 | 6/2002 | McGill et al. | |
| 6,409,455 | B2 * | 6/2002 | Moseley | 414/495 |
| 7,004,454 | B2 * | 2/2006 | Petrone et al. | 254/10 R |
| 7,357,398 | B2 | 4/2008 | O'Connor | |
| 7,360,543 | B1 | 4/2008 | Coleman et al. | |
| 7,494,308 | B2 | 2/2009 | Chun | |
| 2002/0076313 | A1 | 6/2002 | Vartanian, Sr. | |
| 2007/0292249 | A1 | 12/2007 | Wilson | |
| 2008/0000486 | A1 | 1/2008 | Wilson | |

* cited by examiner

PORTABLE TANK LIFTING AND HANDLING APPARATUS

The present utility application hereby formally claims priority of currently pending U.S. Provisional Patent application No. 61/214,147 filed Apr. 20, 2009 on "PORTABLE TANK LIFTING AND HANDLING APPARATUS" filed by the same inventors listed herein, namely, Cielito B. Agoncillo, W. Brian McGinty and Michael P. Ziaylek, and said referenced provisional application is hereby formally incorporated by reference as an integral part of the present application.

BACKGROUND OF THE INVENTION

1. Field of the Invention

The present invention deals with the field of utilized to facilitate lifting and handling of gas tanks such as oxygen tanks especially when placement and movement thereof from one position to a position of a different elevation as required. Such devices often include a manual manipulating mechanism or a powered actuator for facilitating this movement.

These devices are commonly utilized for transporting oxygen cylinders into emergency vehicles and for removal therefrom. The present invention includes a unique construction for assuring that the tank and the tank base are firmly secured on the substrate upon which they are desired to be placed.

2. Description of the Prior Art

Other patents have been designed for facilitating the handling and transporting of utility tanks such as U.S. Pat. No. 1,827,209 patented Oct. 13, 1931 to C. W. Robbins on an "Industrial Truck"; and U.S. Pat. No. 1,896,249 patented Feb. 7, 1933 to F. B. Russell on a "Carrier"; and U.S. Pat. No. 2,463,967 patented Mar. 8, 1949 to E. C. Hefelfinger on a "Cylinder Carriage"; and U.S. Pat. No. 2,500,055 patented Mar. 7, 1950 to R. W. Baker on a "Combined Truck And Hoist Device"; and U.S. Pat. No. 2,624,483 patented Jan. 6, 1953 to E. E. Ketzel on a "Carrier For Welding Outfits"; and U.S. Pat. No. 2,730,257 patented Jan. 10, 1956 to R. H. F. Stresau, Jr. on a "Chassis Truck"; and U.S. Pat. No. 2,738,086 patented Mar. 13, 1956 to W. A. Reich on a "Hand Truck For Handling Banana Bunches"; and U.S. Pat. No. 2,903,147 patented Sep. 8, 1959 to G. E. Davis, Jr. on a "Lifting And Mounting Device For Outboard Motors"; and U.S. Pat. No. 2,905,347 patented Sep. 22, 1959 to F. P. Hopfeld on a "Drum Handling Lift Truck"; and U.S. Pat. No. 3,471,046 patented Oct. 7, 1969 to G. H. Hess on a "Cart For Gas Cylinders"; and U.S. Pat. No. 3,637,097 patented Jan. 25, 1972 to R. R. Horowitz and assigned to S&H Industries, Inc. on a "Power-Operated Tailgate With Maximum Rearward Displacement Between Fully Elevated And Fully Lowered Positions"; and U.S. Pat. No. 3,682,342 patented Aug. 8, 1972 to D. L. Evans on "Lifting Devices"; and U.S. Pat. No. 4,021,070 patented May 3, 1977 to F. J. Shea on a "Mechanical Lift"; and U.S. Pat. No. 4,059,281 patented Nov. 22, 1977 to D. W. Evans and assigned to Towmotor Corporation on a "Mounting Assembly For A Controllably Movable Fluid Tank"; and U.S. Pat. No. 4,205,937 patented Jun. 3, 1980 to N. C. Fawley on a "Carrier For Compressed Gas Cylinders"; and U.S. Pat. No. 4,221,529 patented Sep. 9, 1980 to A. DeShano on a "Delivery Trailer"; and U.S. Pat. No. 4,318,661 patented Mar. 9, 1982 to J. T. Helm and assigned to Dozier Equipment International Company on a "Drum Handling Device For Forklift"; and U.S. Pat. No. 4,536,123 patented Aug. 20, 1985 to W. E. Snyder on a "Hand Truck Apparatus For Elevating And Transporting An Object"; and U.S. Pat. No. 4,615,656 patented Oct. 7, 1986 to J. T. Geraghty, Jr. on a "Cylinder Gripping Attachment For A Fork Lift Truck"; and U.S. Pat. No. 4,738,582 patented Apr. 19, 1988 to J. E. Roberts and assigned to E Manufacturing Company Inc. on a "Tank Carrier And Manipulator"; and U.S. Pat. No. 4,808,056 patented Feb. 28, 1989 to S. Oshima on an "Elevator Device Transportable In A Motor Vehicle"; and U.S. Pat. No. 4,940,381 patented Jul. 10, 1990 to A. L. Rysewyk and assigned to American Telephone and Telegraph Company on a "Mobile Hoist"; and U.S. Pat. No. 5,104,280 patented Apr. 14, 1992 to M. P. Ziaylek et al and assigned to Michael P. Ziaylek on an "Apparatus For Use With An Emergency Vehicle For Storage And Retrieval Of Remotely Located Emergency Devices"; and U.S. Pat. No. 5,145,311 patented Sep. 8, 1992 to F. S. Salvucci and assigned to Anthony Welded Products, Inc. on a "Cylindrical Tank Lift With Four Wheels For Mobility And Stability"; and U.S. Pat. No. 5,207,550 patented May 4, 1993 to M. S. Lehman and assigned to Valley Craft on a "Drum Handler"; and U.S. Pat. No. 5,209,628 patented May 11, 1993 to C. C. Hassell on a "Self-Loading Dolly Mount Apparatus"; and U.S. Pat. No. 5,307,839 patented May 3, 1994 to K. L. Loebker et al on a "Bottled Gas Cart"; and U.S. Pat. No. 5,340,136 patented Aug. 23, 1994 to R. M. MacNeil et al and assigned to Canadian Liquid Air Ltd. on a "Cylinder Cart With Magnetics"; and U.S. Pat. No. 5,344,278 patented Sep. 6, 1994 to H. Emig, Jr. on an "Apparatus For Raising And Moving An Open Ended Container"; and U.S. Pat. No. 5,346,357 patented Sep. 13, 1994 to C. C. Hassell on a "Self-Locking Parallel-Motion Dolly Mount"; and U.S. Pat. No. 5,366,338 patented Nov. 22, 1994 to E. P. Mortensen on a "Lift And Tow Motorcycle Transporter"; and U.S. Pat. No. 5,440,098 patented Aug. 8, 1995 to T. A. Matus and assigned to Miller Electric Manufacturing Co. on a "Gas Cylinder Lifting System"; and U.S. Pat. No. 5,518,357 patented May 21, 1996 to T. Ziaylek, Jr. et al and assigned to Theodore Ziaylek, Jr. and Michael P. Ziaylek on a "Retaining And Retrieval Apparatus For Storage Of A Ladder Upon A Vehicle Shelf Area"; and U.S. Pat. No. 5,618,154 patented Apr. 8, 1997 to A. J. Irons, Jr. et al and assigned to Easy Lift Equipment Co., Inc. on a "Drum Transporter"; and U.S. Pat. No. 5,658,118 patented Aug. 19, 1997 to B. Luca on a "Cylinder Transporter"; and U.S. Pat. No. 5,791,857 patented Aug. 11, 1998 to T. Ziaylek, Jr. et al and assigned to Theodore Ziaylek, Jr. and Michael Paul Ziaylek on an "Automatic Ladder Lowering And Storage Device For Use With An Emergency Vehicle"; and U.S. Pat. No. 5,984,612 patented Nov. 16, 1999 to M. D. Tatro on a "Tank Lifting Device"; and U.S. Pat. No. 5,944,474 patented Aug. 31, 1999 to M. M. Cummins et al and assigned to Drum Runner Material Handling Co. on a "Support For A Cylindrical Container"; and U.S. Pat. No. 6,086,312 patented Jul. 11, 2000 to M. P. Ziaylek et al on a "Tank Handling Apparatus"; and U.S. Pat. No. 6,171,048 patented Jan. 9, 2001 to C. J. Grimes on a "Fire Suppression Agent Storage Container Lifting And Transportation Device"; and U.S. Pat. No. 6,368,048 patented Apr. 9, 2002 to E. A. Womble et al on a "Transport Cart For Elongated Objects"; and U.S. Pat. No. 6,406,248 patented Jun. 18, 2002 to D. E. McGill et al on an "Apparatus For Lifting And Moving An Upright Cylindrical Container"; and U.S. Pat. No. 7,357,398 patented Apr. 15, 2008 to J. J. O'Connor and assigned to Lincoln Global, Inc. on a "Cart For Welding Operations"; and U.S. Pat. No. 7,360,543 patented Apr. 22, 2008 to G. Coleman et al and assigned to Itec Manufacturing Ltd. on a "Patient Assist Lift"; and U.S. Publication No. 2002/0076313 published Jun. 20, 2002 to R. Vartanian Sr. on a "Platform Lift"; and U.S. Publication No. 2007/0292249 published Dec. 20, 2007 to M. Wilson and assigned to Itec Manufacturing, Ltd. on a "Compact System For Lifting And Moving Pressurized Tank"; and United States Publication No. 2008/0000486 published Jan. 3, 2008 to M. Wilson and assigned to Itec Manufacturing, Ltd. on "Straps For Restraining A Patient's Arms".

SUMMARY OF THE INVENTION

The present invention provides a tank lifting and handling apparatus including a transport carriage assembly having a main transport frame which is generally U-shaped and a vertical beam secured to the main transport frame and extending upwardly therefrom. The transport carriage assembly also includes a reinforcement cross member secured to the vertical beam and also secured to the main transport frame and extending therebetween which effectively increases the overall structural strength of the total configuration of the transport carriage assembly.

The apparatus further includes a parallel swing assembly pivotally mounted with respect to the main transport frame and extending outwardly therefrom. The parallel swing assembly defines a slot configuration extending therethrough which is elongated generally in a vertical direction. The parallel swing assembly includes a support end pivotally attached with respect to the transport carriage assembly as well as a bracket end spatially disposed from the support end.

The apparatus further includes a drive which includes a portion thereof which is longitudinally extendable and retractable and is attached to the transport carriage assembly and the parallel swing assembly such that it extends therebetween. The parallel swing assembly is movable to a tank lifted position responsive to movement of the drive means in an extending direction. The parallel swing assembly is also movable to a tank lowered position responsive to retracting movement of the drive means.

The apparatus further includes a tank retaining bracket pivotally attached with respect to the bracket end of the parallel swing assembly. The tank retaining bracket defines a tank receiving zone thereadjacent extending therealong which is adapted to receive a tank for selectively retaining thereof within the zone adjacent to the tank retaining bracket.

This tank retaining bracket further includes an upper securement mechanism attached with respect to the parallel swing assembly and a lower securement mechanism which is movably attached with respect to the parallel swing assembly at a location below the upper securement mechanism. The lower securement mechanism includes a lower securement foot positioned below the tank receiving zone to facilitate supporting of the tank thereabove which is selectively retained within the tank receiving zone. The lower securement mechanism is vertically slidably movable with respect to the parallel swing assembly to facilitate supporting of the tank positioned within the tank receiving zone.

Furthermore the apparatus of the present invention includes a tank securement apparatus attached to the tank retaining bracket adjacent the tank receiving zone defined therewithin and selectively engageable with respect to the tank for retaining thereof in position adjacent the tank retaining bracket within the tank receiving zone thereadjacent.

Furthermore the apparatus of the present invention includes a sliding engagement mechanism operative to slidably engage the lower securement mechanism of the tank retaining bracket with respect to a slot defined in the parallel swing assembly. This sliding engagement mechanism preferably includes a stud extending through the tank retaining bracket and through the slot as well as a nut such as a lock nut which is securable to the stud to maintain the slidably movable engagement between the tank retaining bracket and the parallel swing assembly. The slidable engagement mechanism further includes an inner collar positioned extending around the stud at a location within the slot. This inner collar has an outside diameter which is a dimension less than the interior width of the slot to facilitate slidable movement therebetween while facilitating engagement between the tank retaining bracket and the parallel swing assembly. An outer collar may be included positioned extending around the stud at a location laterally adjacent the slot between the parallel swing assembly and the stud to maintain a minimum lateral spacing therebetween to facilitate vertical relative movement relative to one another.

It is an object of the present invention to provide a portable tank lifting and handling apparatus which has minimal maintenance requirements.

It is an object of the present invention to provide a portable tank lifting and handling apparatus which includes a minimum number of moving parts.

It is an object of the present invention to provide a portable tank lifting and handling apparatus which is easily maintained as well as easily assembled and disassembled.

It is an object of the present invention to provide a portable tank lifting and handling apparatus which is stable in design and strength.

It is an object of the present invention to provide a portable tank lifting and handling apparatus which can transport tanks of various configurations.

It is an object of the present invention to provide a portable tank lifting and handling apparatus which can lift tanks upwardly and move deep inwardly toward a position of placement due to the fact that the tank is gripped by parallel linkage created by two parallel extending swing braces.

It is an object of the present invention to provide a portable tank lifting and handling apparatus which is completely portable due to a plurality of wheels some of which include locking plates thereon to facilitate stability of the carriage assembly during placement and removal of tanks from a desired location.

It is an object of the present invention to provide a portable tank lifting and handling apparatus which can be utilized by a single person to facilitate placement or removal of the tank from any position including those positions having a moderately different elevation from the current position of the tank.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

Figure 1:
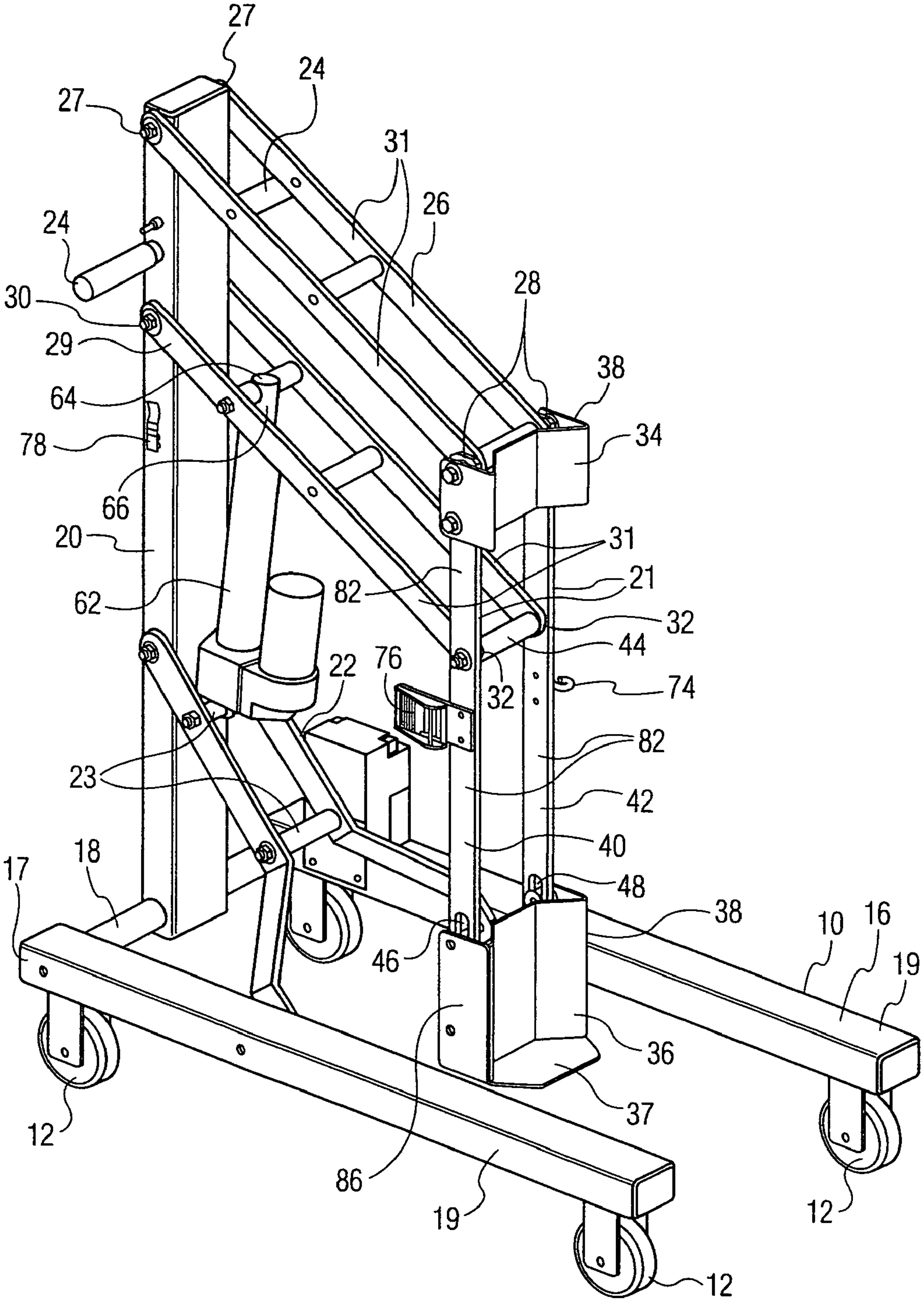
FIG. 1 is a front three-quarter perspective taken from the left of an embodiment of the tank lifting and handling apparatus of the present invention shown with the tank in the tank lowered position.

The present invention provides a tank lifting and handling apparatus which includes a transport carriage assembly 10 including a main transport frame 19 with a plurality of rollers or wheels 12 positioned extending therebelow greatly facilitates portability thereof. One or more of the rollers or wheels 12 can include locking plates 13 for selectively locking thereof to facilitate stability of the transport carriage assembly 10 whenever a tank is being lifted and/or handled in some manner or otherwise moved.

The main transport frame 19 of the transport carriage assembly 10 includes a first frame side member 16 and a second frame side member 17 extending approximately parallel with respect to one another with a frame cross member 18 extending therebetween. The individual rollers or wheels 12 are preferably mounted with respect to the lower portion of the first frame side member 16 and the second frame side member 17 to facilitate portability thereof.

The transport carriage assembly further includes a vertical beam member 20 which extends approximately vertically upwardly from approximately the central location of the frame cross member 18. This vertical beam member provides an upwardly extending surface to which the tank retaining bracket 21 can be attached through a parallel swing assembly which includes a first parallel swing brace 26 and a second parallel swing brace 29 each of which is movably secured with respect to the vertical beam member 20. Preferably the first parallel swing brace 26 is secured near the uppermost portion of vertical beam member 20 and the second parallel swing brace 29 is movably secured with respect to the vertical beam member 20 at a location therebelow. The first parallel swing brace 26 and the second parallel swing brace 29 preferably extend outwardly from the movable connections thereof with respect to the vertical beam member 20 in a direction such that the they are approximately parallel with respect to one another.

Reinforcement of the perpendicular orientation and mounting of the vertical beam member 20 with respect to the frame cross member 18 of the transport carriage assembly 10 can be facilitated by the inclusion of an angular reinforcement member 22 as shown best in FIG. 1. Angular reinforcement member 22 preferably includes two separate downwardly extending members along with reinforcement cross members 23 extending therebetween.

To facilitate handling of the apparatus of the present invention the vertical beam member 20 can include a handle means 24 extending outwardly therefrom to facilitate movement of the carriage assembly 10 when the wheels 12 are unlocked.

The parallel swing brace assembly 31 will define a first support end 27 and first bracket end 28. The first support end 27 is pivotally secured with respect to a portion of the transport carriage assembly such as with respect to the vertical beam member 20 and the first bracket end 28 is pivotally secured with respect to the tank retaining bracket 38. In a similar manner the second parallel swing brace 29 will include preferably a second support end 30 and a second bracket end 32. The second support end 30 is pivotally secured to, preferably, the vertical beam member 20 at a position below the point of securement of the first support end 27 of the first parallel swing brace 26 thereto. The second bracket end 32 of the second parallel swing brace 29 is preferably secured with respect to the tank retaining bracket 21 at a position below the point of securement of the first bracket end 28 thereto. Preferably the points of connection of the first support end 27 and the second support end 30 with respect to the vertical beam member 20 are spaced apart at an equal distance between the points of connection of the first bracket end 28 and the second bracket end 32 with respect to the tank retaining bracket 38. In this manner the parallel orientation between the first parallel swing brace 26 and the second parallel swing brace 29 will be maintained as the tank retaining bracket 38 is moved thereby maintaining any tank retained thereadjacent in vertical orientation at all times during movement. However, due to the movement of this parallel swing assembly 31 as the tank 11 is moved upwardly toward a position of placement or as it is moved downwardly, the distance between the tank 11 and the vertical beam member 20 will vary. That is, as the tank is moved upwardly this distance will increase and as the tank is moved downwardly this distance will decrease. This is an important characteristic of the present invention because it allows placement of a tank 11 within rather deep locations thereby minimizing danger to workers.

The parallel swing assembly further includes a mounting frame 82 which includes the first vertical strut 40 and the second vertical strut 42 as portions thereof extending generally vertically. A tank receiving zone 80 will preferably be defined adjacent to the tank retaining bracket means 38 which is positioned extending generally longitudinally vertically therealong. To facilitate securement of a tank 11 within zone 80, the tank retaining bracket means 38 will preferably include an upper securement member 34 attached to mounting frame 82. The upper portion of a tank 11 will be positionable in engageable with respect to the upper securement member 34. A lower securement member 36 will be attached to mounting frame 82 at a positioned below the upper securement member 34 and will be adapted to receive the lower portion of the tank 11 in engagement therewith responsive to the tank 11 being in the tank receiving zone 80 thereadjacent. The lower securement member 36 will preferably include a lower securement base or foot 37 will be included in the configuration of the lower securement member 36 or preferably will be an integral part thereof such that it will provide a base or foot beneath the zone 80 to support the bottom of the tank to facilitate secure retaining thereof.

The detailed construction of the mounting frame 82 includes a first vertical strut 40 and a second vertical strut 42 extending approximately parallel with respect to one another and including one or more retaining bracket cross-members 44 extending therebetween for structural strength and integrity.

The first vertical strut 40 will preferably define a first slot means 46 extending therethrough which preferably runs longitudinally in a vertical direction. In a similar manner the second vertical strut 42 will preferably define a second slot means 48 extending therethrough also running approximately longitudinally vertically therewithin. These two slots will be located in the vertical struts 40 and 42 a position immediately adjacent to the location of mounting of the lower securement member 36. It should be appreciated that the first slot means 46 and the second slot means 48 can comprise a single vertically extending slot or multiple vertically extending slots. In the apparatus shown in the present invention, as particularly shown in FIG. 7, the first slot means 46 defined in the first vertical strut 40 defines two vertically extending slots and the second slot means 48 defined in the second vertical strut 42 defines particularly two individual slots running vertically longitudinally therealong.

Figure 4:
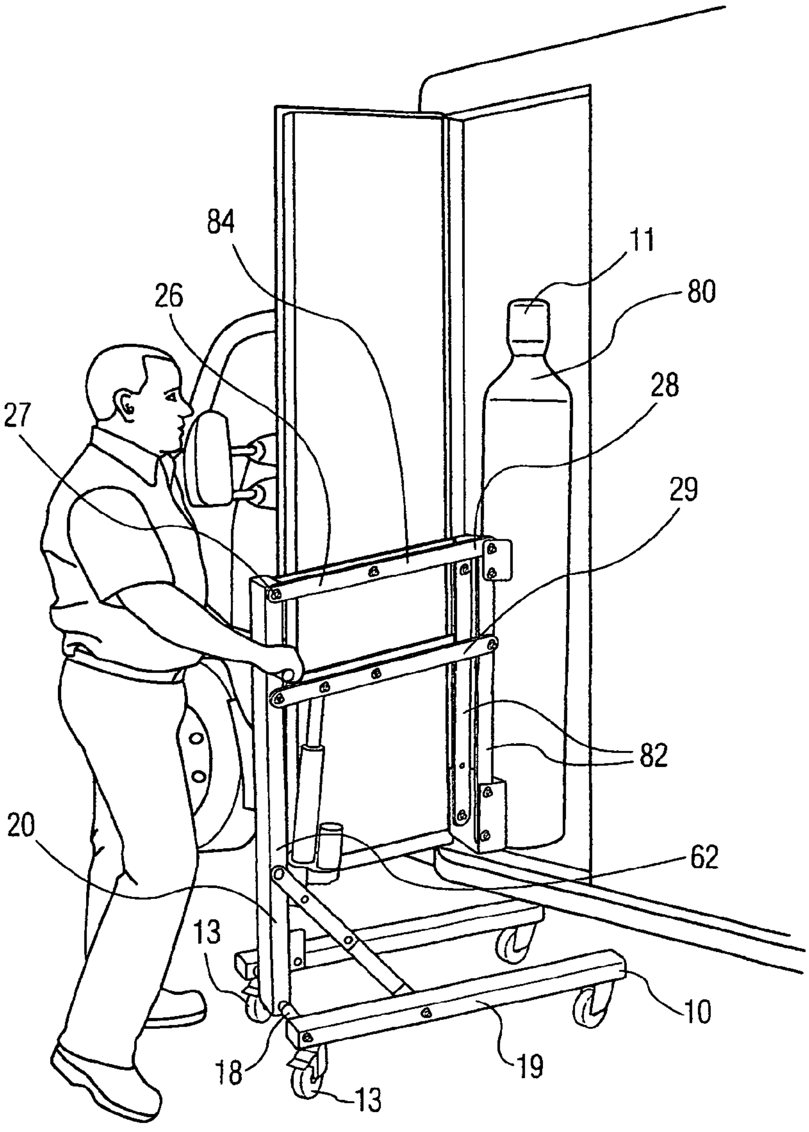
FIG. 4 is a side perspective view of an illustration of an example of usage of an embodiment of the present invention showing a tank in the tank lifted position ready for placement or removal of a tank with respect to an emergency vehicle.
Figure 5:
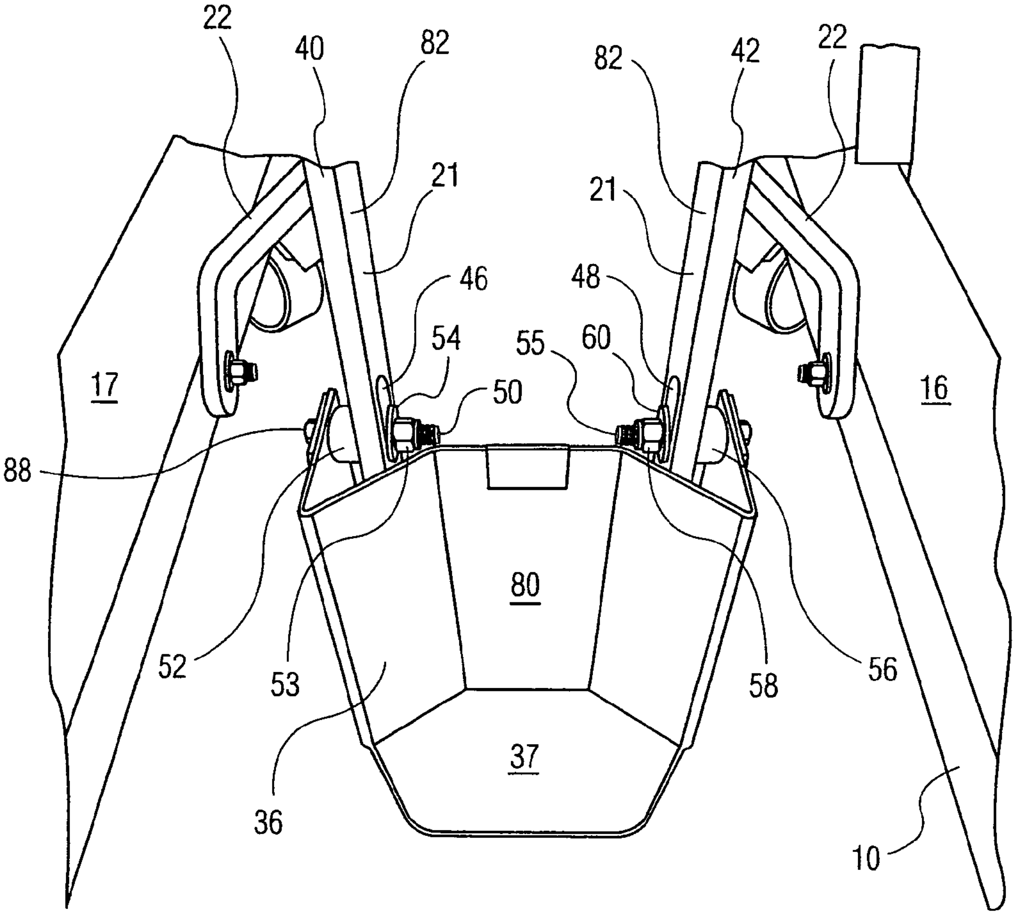
FIG. 5 is a top plan view showing an exploded view of the lower securement member of the present invention clearly showing the lower securement base or foot taken from the front.

One of the important characteristics of the present invention is in the automated powering of movement of the apparatus. For this purpose a drive means 62 which can comprise any type of a linear actuator is provided. This linear drive actuator means will include a drive output shaft 64 longitudinally movable with respect to the drive responsive to actuation or powering thereof. Drive means 62 powers movement of the tank 11 between the tank lowered position 86 shown in FIG. 1 and the tank lifted position 84 shown in FIG. 4.

Figure 2:
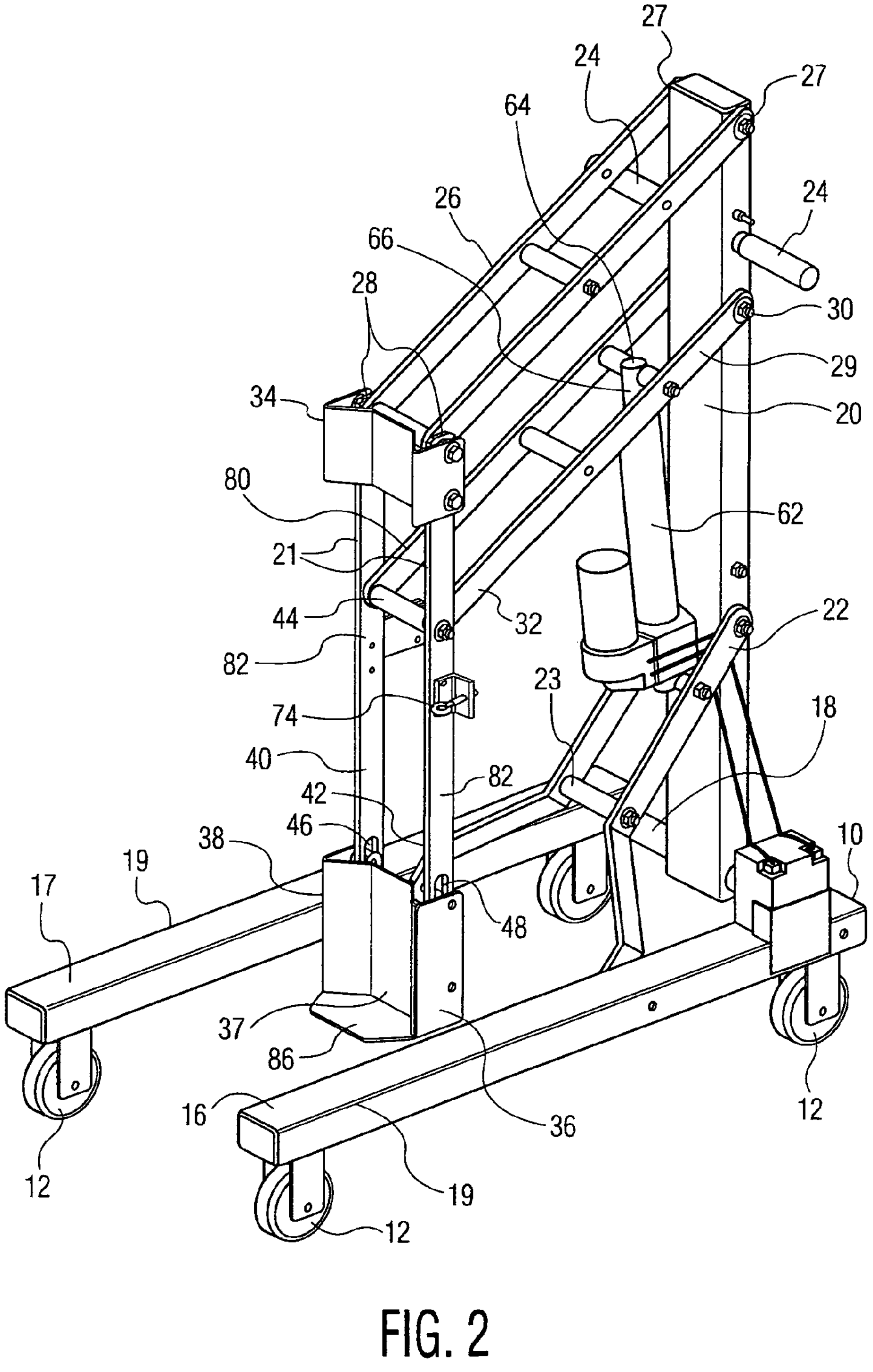
FIG. 2 is a front perspective view taken from the left of the embodiment shown in FIG. 1.
Figure 3:
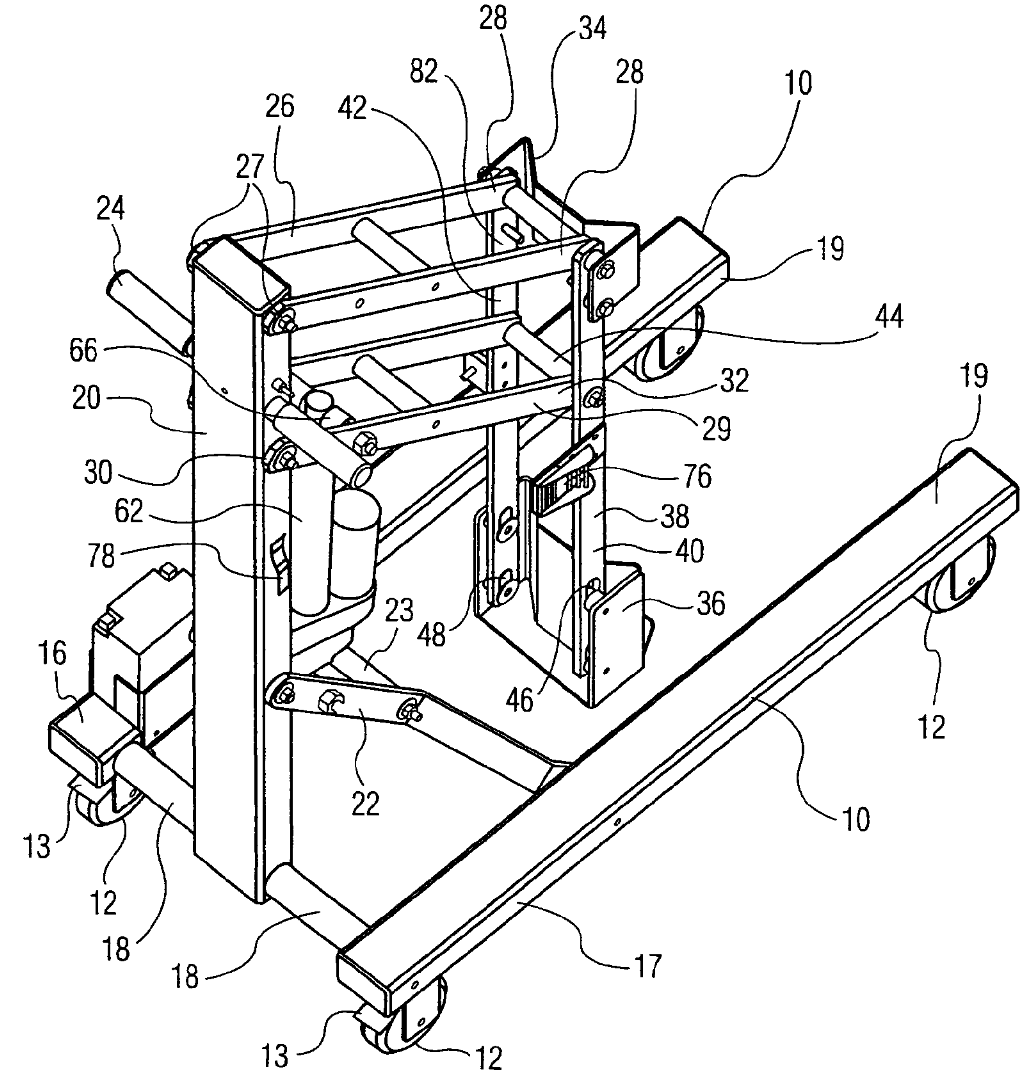
FIG. 3 is a top perspective view of the embodiment shown in FIG. 1.

In the apparatus of the present invention the drive output shaft 64 will define a drive output shaft aperture 66. This construction is particular to this embodiment although other constructions can be utilized to achieve a similar purpose. The drive output shaft aperture 66 is defined in this embodiment to receive one of the cross members of the second parallel swing brace 29 as shown best in FIGS. 1 and 2. The base of the linear actuator 62 is pivotally secured to one of the reinforcement cross members 23 of the angular reinforcement member 22. Thus, the drive means 62 is pivotally secured with respect to both of these members and can move slightly with respect to one another which is an important characteristic to facilitate control of movement thereof. That is, as the drive means 62 is powered, the drive output shaft 64 will extend longitudinally outwardly therefrom urging movement of the second parallel swing brace 29 as well as the first parallel swing brace 26 and the tank retaining bracket 38 vertically to lift a tank if positioned in securement with respect to the tank retaining bracket 38. Similarly linear actuator 62 can be powered to retract the drive output shaft 64 thereof causing the first parallel swing brace 26 and the second parallel swing brace 29 to move downwardly as shown in FIG. 1 and move the tank 11 toward a resting position upon the substrate therebelow.

Figure 12:
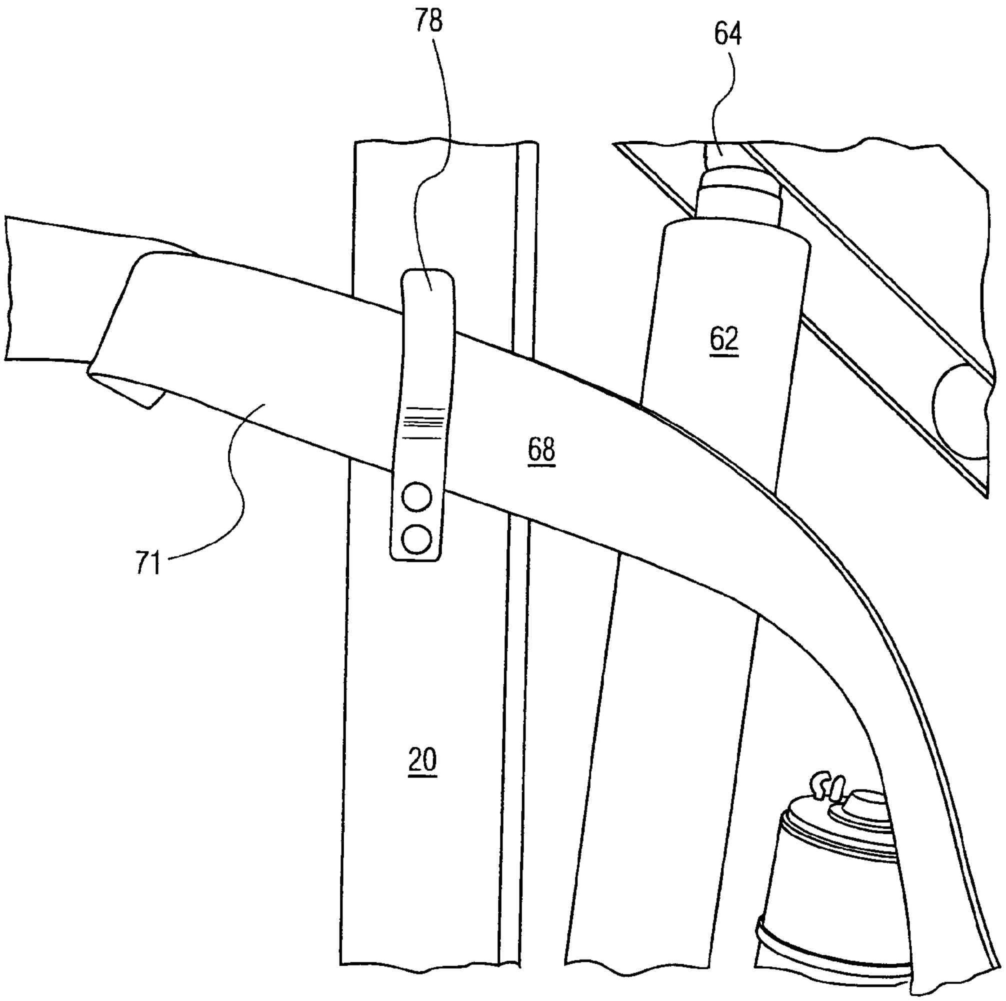
FIG. 12 is a close-up of the end portion of the belt of an embodiment of the present invention shown the belt retained within the belt end retaining clip.

Retaining of a tank 11 in position adjacent to the tank retaining bracket 38 can be facilitated by the inclusion of tank securement apparatus 71 which preferably includes a belt means 68. Preferably the belt means 68 includes a loop formed by a sewn section 70 and a detachable belt hooking means 72 such as a clasp or the like mounted with respect to the sewn loop 70 which is detachably securable with respect to a belt eyelet 74 mounted on one side of the tank retaining bracket 38. The other side of the tank retaining bracket 38 may include a belt buckle 76 which may preferably be continuously adjustable for being in engagement with respect to the buckle at a continuum of possible locations therealong. A belt retaining clip 78 as best shown in FIG. 12 can be mounted with respect to the vertical beam member 20 or any other convenient location to retain excessive lengths of the belt such that a significantly long belt can be utilized which will be capable of usage with tanks of various different sizes and configurations. Each of these constructions defined above define a quickly releasably and yet very secure tank securement apparatus 71 for selectively retaining of a tank 11 within the tank receiving zone 80.

Figure 13:
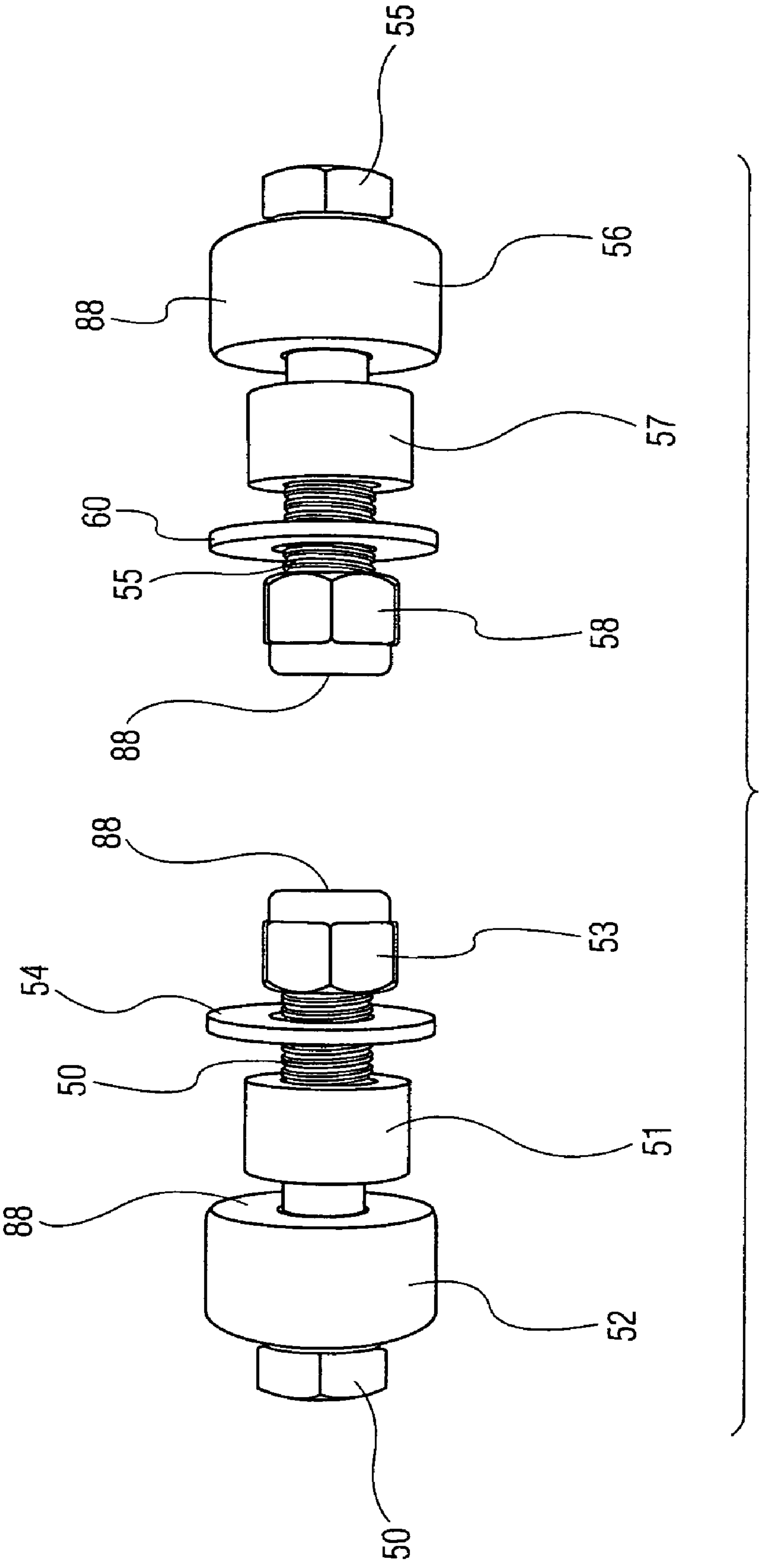
FIG. 13 is a close-up illustration of the attachment hardware which secures the lower securement member movably with respect to the first and second vertical struts of the tank retaining bracket to facilitate positioning of a tank by the present invention gently and firmly in contact with the substrate on which it is desired to be placed.

One of the most important aspects of the present invention is in the ability to gently position a tank solidly upon the ground or other substrate surface. That is, the drive means 62 of the present invention is powered both for lifting of the tank and for lowering of the tank and to coordinate the lowering of the tank such that the lowermost portion of the tank rests comfortably and without exerting force downwardly upon the ground or floor substrate is a difficult task and requires very accurate timing and spacing between the tank and the floor while the operator runs the linear actuator. The present invention provides a means for facilitating gently placing of the tank retaining bracket means 38 on the ground while a tank is secured thereto in order to minimize damage to the tank 11 itself and yet reach the fully down position of the tank retaining bracket 21 such that all the weight of the tank is fully supported by the ground therebeneath. This purpose is achieved by providing a sliding engagement apparatus 88 operative with slots defined in each of the struts 40 and 42 and, thus, providing a vertically movable engagement between the lower securement member 36 (and base 37) and the first and second vertical struts 40 and 42 with the lower securement member 36 extending downwardly beyond the lowermost portions of the struts 40 and 42. This sliding engagement apparatus 88 between the lower securement member 36 and the two struts 40 and 42 is achieved by a unique combination of attaching hardware shown in FIG. 13. FIG. 13 shows a first stud means 50 with a first inner collar means 51 and a first outer collar means 52 and a first nut 53 as well as a first washer 54 positioned between the first nut 53 and the first inner collar means 51. Similarly this figure shows a second stud means 55 including a second outer collar means 56 and second inner collar means 57 as well as a second washer means 60 and a second nut means 58. The hardware shown individually in FIG. 13 is also shown in engagement with slots 46 and 48 in FIG. 7. When the lower securement foot 37 is not in engagement with the substrate therebelow and when a tank 11 is positioned in zone 80 on this base 37, the weight of the tank will urge the lower securement member 36 to move to the lowermost position as shown best in FIG. 6. As the tank retaining bracket 38 is moved downwardly by retraction of the longitudinally extending drive output shaft 64 of the linear actuator 62 the undersurface of the lower securement foot 37 will contact the substrate therebelow which can be of ground, cement, asphalt or any other surface upon which the apparatus of the present invention is designed to be rested. In most constructions merely the weight of the lower securement member will be sufficient to cause it to move to the lowermost position relative to the struts 40 and 42 even when a tank is not positioned within the zone 80. When using a positively driven drive means 62 the length of the slots 46 and 48 will greatly aid an operator in being sure that when a tank is positioned in the zone 80 supported on lower securement foot base 37 that the weight of the tank will be resting upon the substrate therebeneath. This is an important consideration since it is not desirable that the tank be perilously supported only by the tank lifting and handling apparatus of the prevent invention when an operator is not present without being in direct contact with the ground to support the weight of the tank.

In order words, it is a difficult task to operate the linear actuator such that it is turned off instantly as soon as the undersurface of the lower securement member 36 or foot 37 contacts the substrate. As such, the slotted movement capability of the apparatus of the present invention provides some variation in this precise positioning while still allowing the tank to be firmly positioned upon the ground. This capability is due to the vertical slideable movement capability of the tank retaining bracket 38 with respect to the struts 40 and 42 due to the unique hardware configuration which attaches them with respect to one another in a slidably movable manner.

Figure 6:
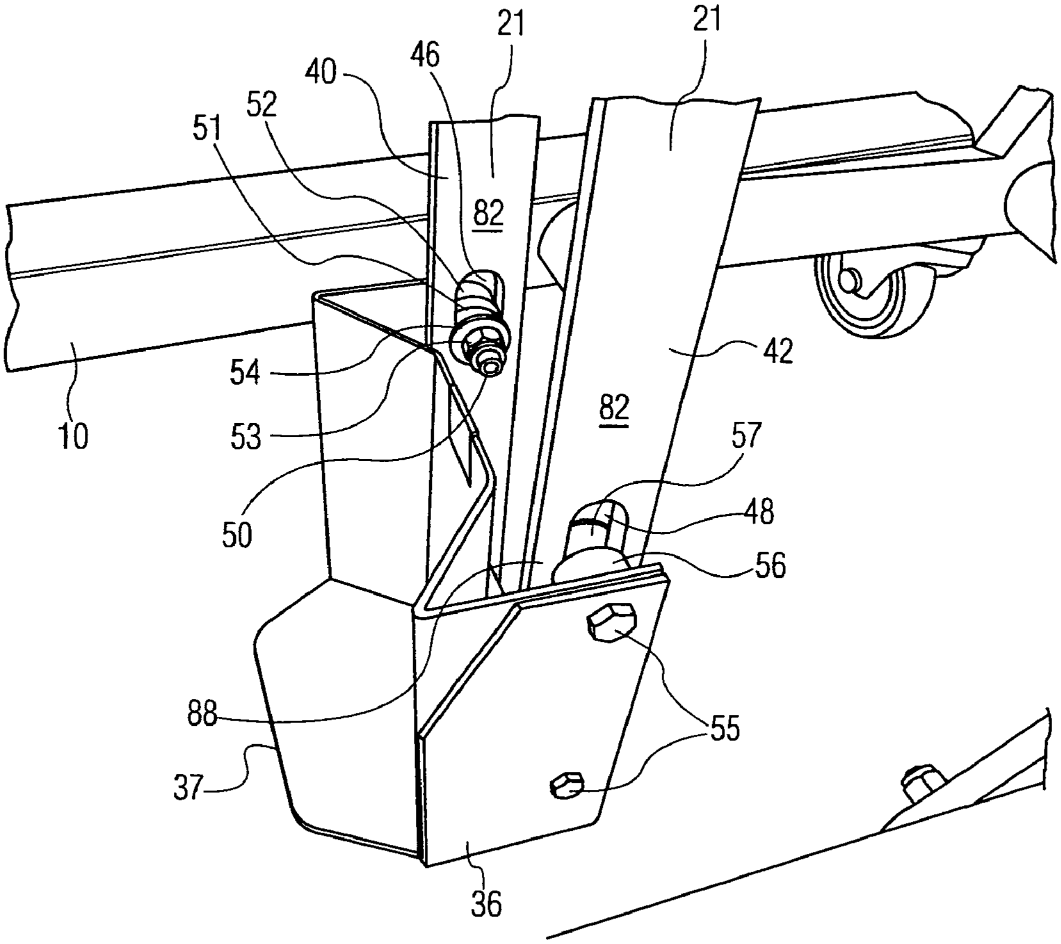
FIG. 6 is a side plan view of the exploded portion of the present invention as shown in FIG. 1 taken from the left wherein the vertically slidable lower securement member is positioned in the lowermost position thereof.
Figure 7:
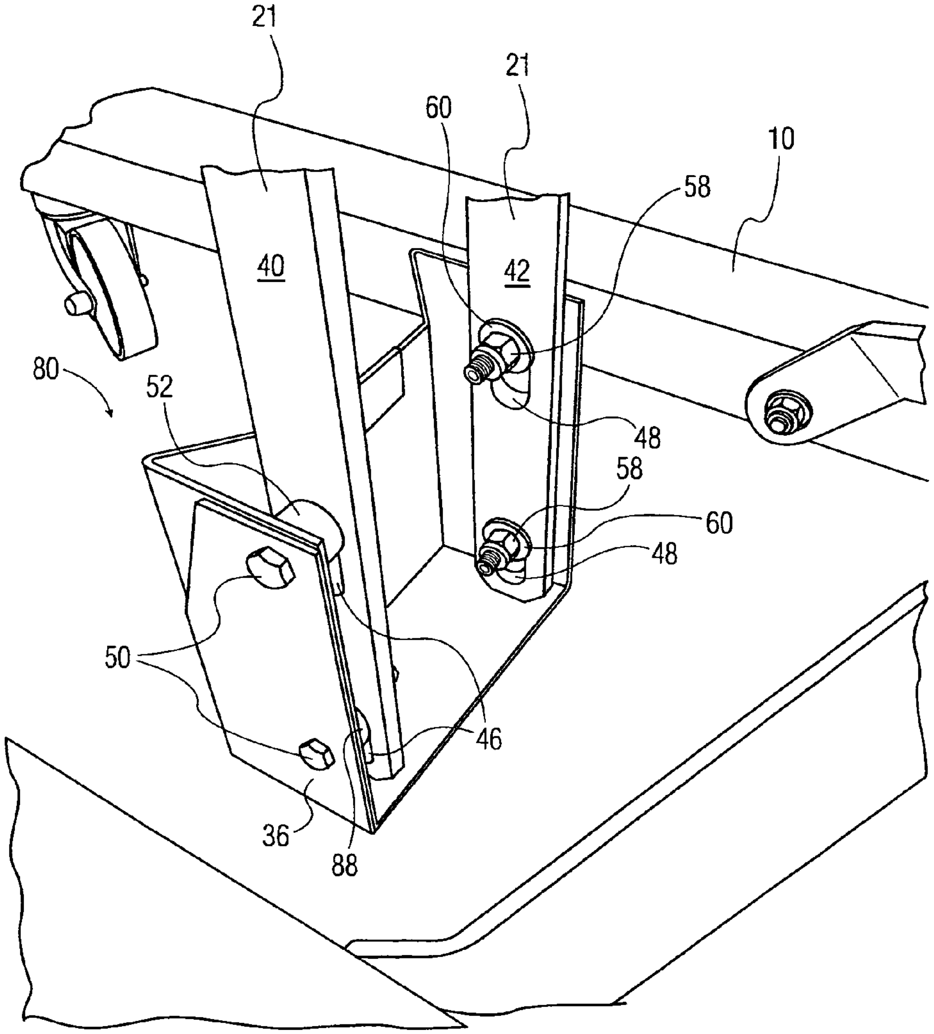
FIG. 7 is a three-quarter perspective of the illustration shown in FIG. 1 wherein the lower securement member is shown in the uppermost position thereof.
Figure 8:
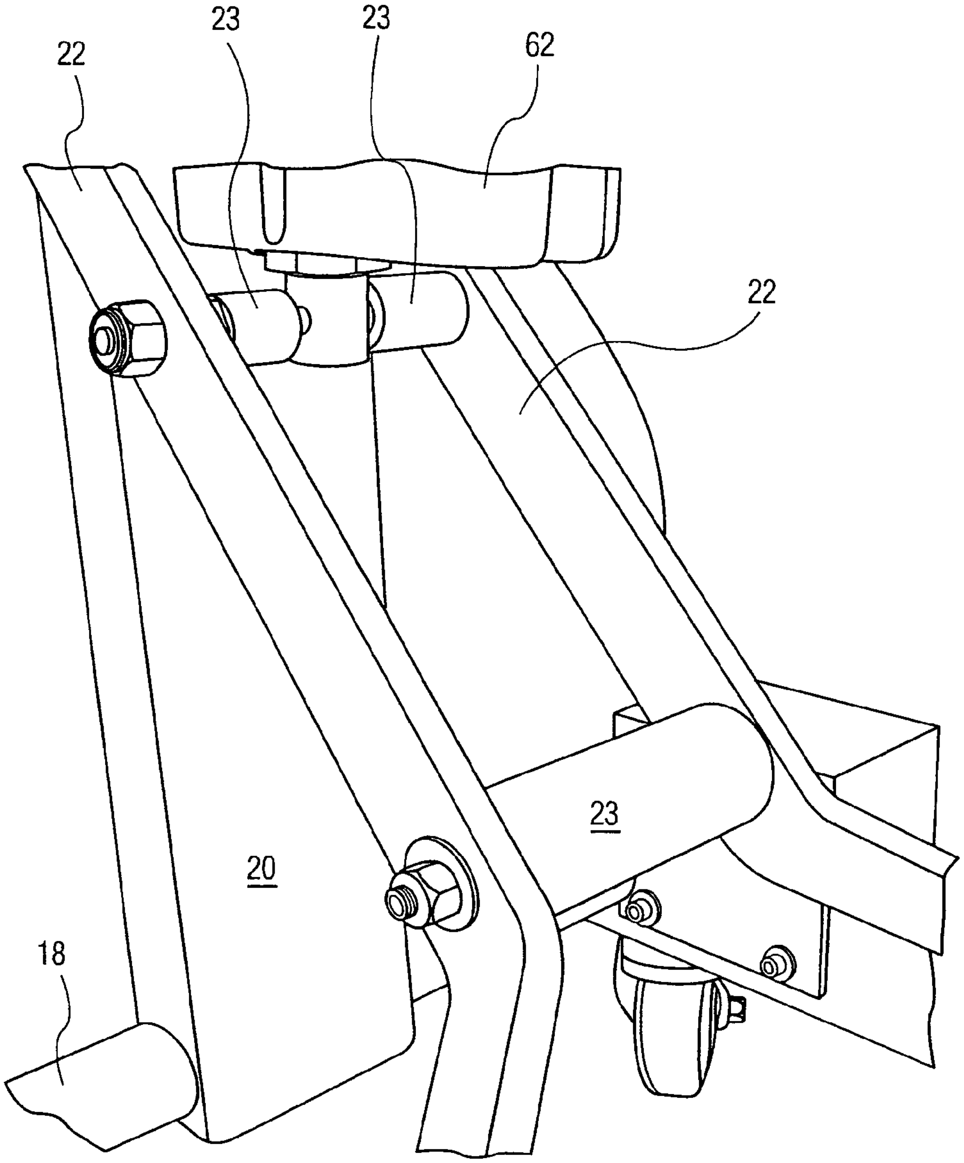
FIG. 8 is a close-up illustration of the upper portion of the angular reinforcement member showing the pivotal connection of the linear drive actuator means thereto.
Figure 9:
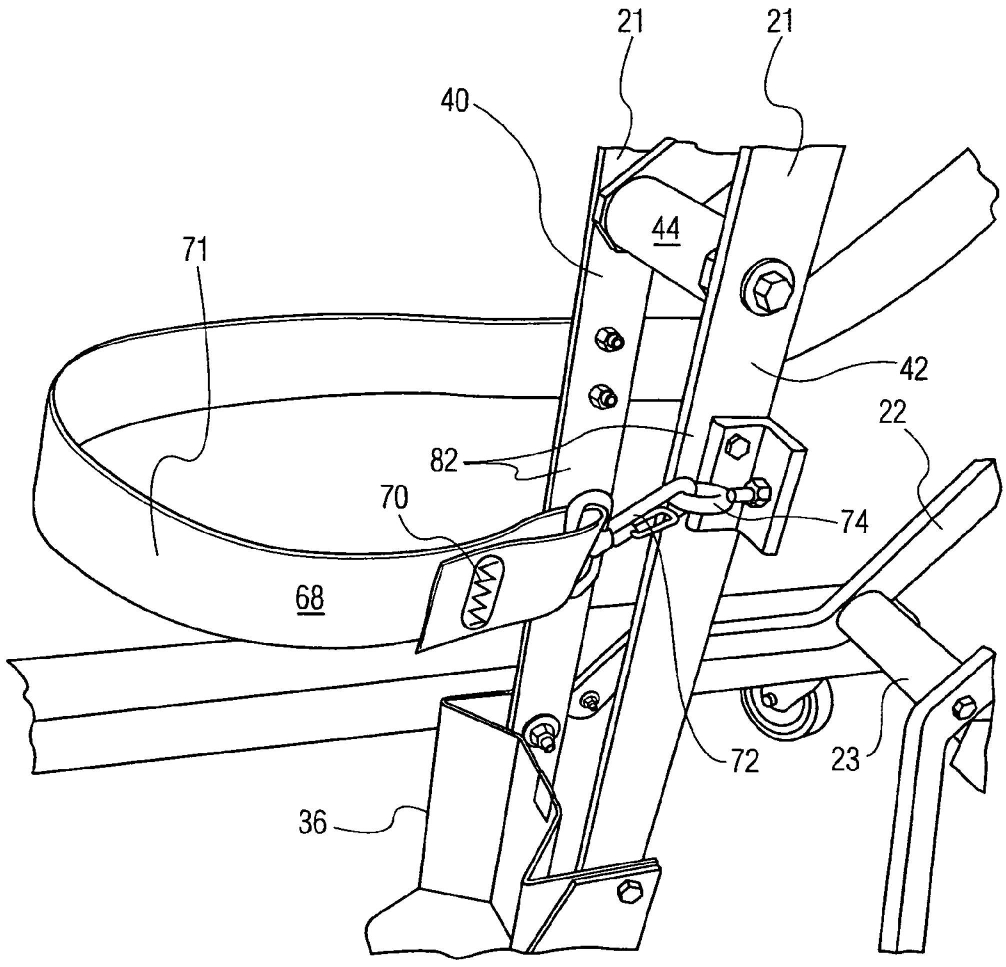
FIG. 9 is a closer up illustration showing the engagement between the sewn loop of the belt and the detachable belt hook securable with respect to a belt eyelet which itself is mounted with respect to the second vertical strut of the tank retaining bracket.
Figure 10:
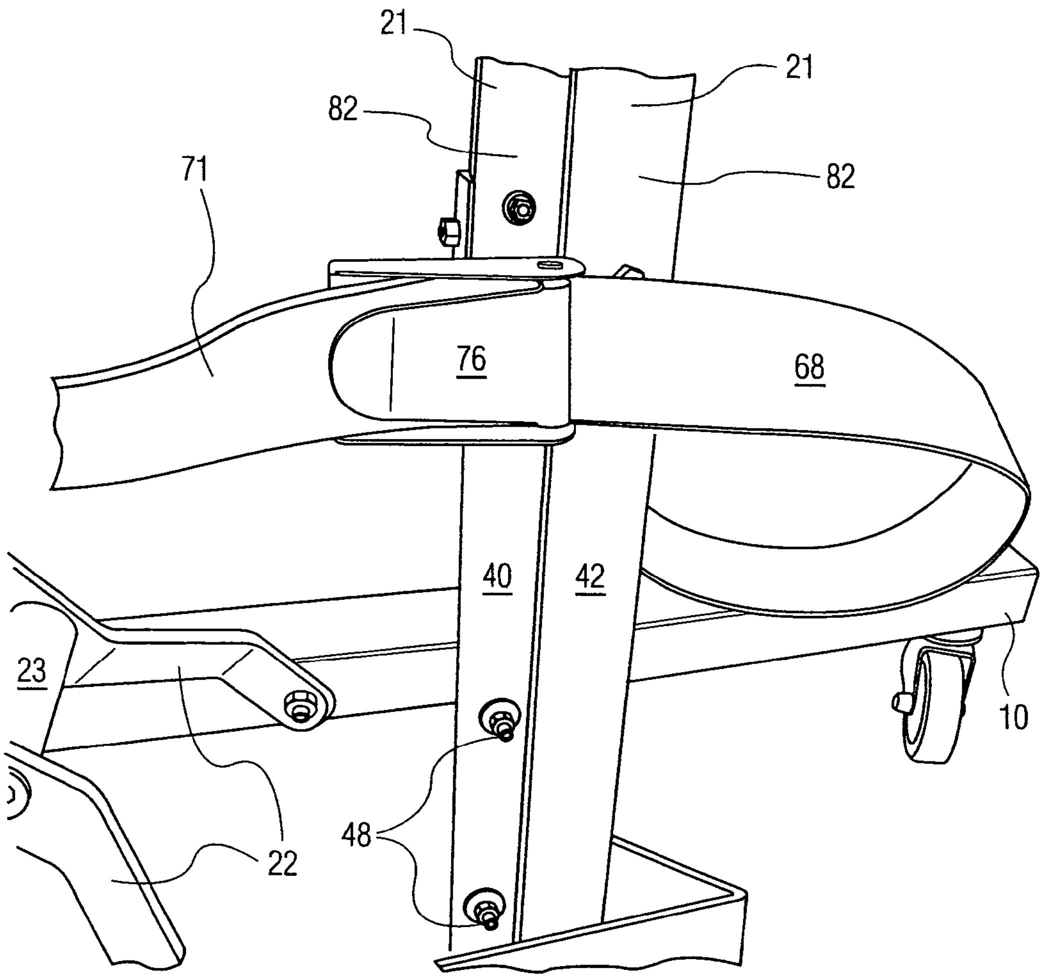
FIG. 10 is a close-up illustration of the continuously adjustable engaging belt buckle detachably securable with respect to the belt and mounted on the tank retaining bracket shown in the closed position.
Figure 11:
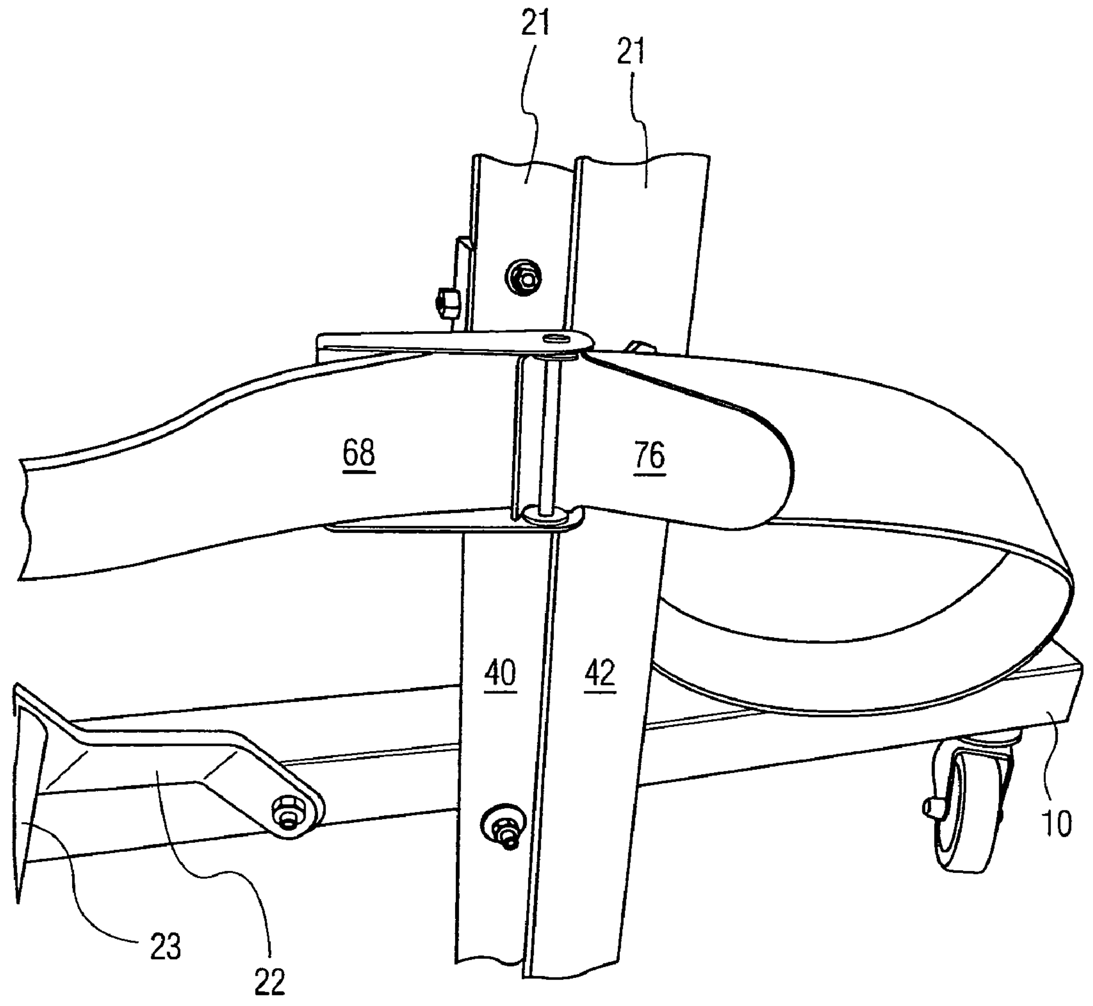
FIG. 11 is an illustration of an embodiment shown in FIG. 10 while in the opened position.

Once the undersurface of the lower contacts the ground the user can maintain downward movement of the linear actuator for another one quarter of an inch, or a half inch or three-quarters of an inch or even greater inch during which time the lower securement member 36 will be held firmly in position by the substrate therebelow without moving and the two struts will continue to move downwardly thereby moving the first stud means 50 and the second stud means 55 to an intermediate position within the slots 46 and 48, respectively, at a position between the lowermost position shown in FIG. 6 and the uppermost position shown in FIG. 7. Prior to contact between the lower securement foot 37 and the ground the weight of the foot 37 as well as the weight of the tank will cause the lower securement member 36 to move toward the lower position as shown in FIG. 6. After contact with the ground then the foot will remain stationary and the struts 40 and 42 will continue to move downwardly until the relative positioning between the foot and the struts will cause them to move toward the position shown in FIG. 7. This construction will provide a tolerance or acceptable inaccuracy in the timing of terminating operation of the linear actuator. In other words it will increase the tolerance of the timing to place the tank in contact such that it will be in firm contact with the substrate therebelow due to this slotted interconnection so that the ground will support the weight of the tank rather than the apparatus of the present invention.

This slotted interconnection is provided by the hardware shown in FIG. 13. The first inner collar means 51 and the second inner collar means 57 are positioned within the slot and the apparatus includes nuts 53 and 58 which are preferably lock nuts which are capable of locking to the stud while maintaining a loose connection laterally between the lower securement member 36 and the struts 40 and 42 such that it is vertically movable to a length equal to the length of the slots. Therefore the diameter of the inner collars 51 and 57 must be slightly less than the inside diameter of the slots 46 and 48. The washers 54 and 60 will facilitate engagement of the struts 40 and 42 relative to the respective inner and outer collars responsive to tightening of the nuts 53 and 58 thereagainst. The outer collars 52 and 56 will maintain a lateral spacing outwardly between the outer surfaces of the first vertical strut 40 and the second vertical strut 42 and the holes in the lower securement member 36 through which the studs 50 and 55 protrude. Thus, the increased tolerance in vertical placement of the tank upon the ground becomes very important when considering the significant weight of tanks being manipulated in this manner because it is very important that the weight of the tank in fully supported the ground before they are disengaged from the portable tank lifting and placement apparatus or after they are initially placed into zone 80 for handling and manipulating thereof. The wider tolerance in the vertical positioning of the tank support apparatus is provided by this slidable engagement between the lower securement member 36 and the vertical struts 40 and 42 and this added tolerance is an important safety consideration which greatly increases the utility of the present invention.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

The invention claimed is:

1. A tank lifting and handling apparatus for moving a tank between an elevated tank lifted position and a tank lower position in resting abutment with an environmental substrate therebeneath comprising:

A. a transport carriage assembly including:
   (1) a main transport frame;
   (2) a vertical beam means secured to said main transport frame and extending upwardly therefrom;
B. a parallel swing assembly pivotally mounted with respect to said main transport frame and extending outwardly therefrom, said parallel swing assembly including:
   (1) a support end pivotally attached with respect to said transport carriage assembly;
   (2) a bracket end spatially disposed from said support end, said bracket end of said parallel swing assembly including;
      a. a first strut means defining a first slot means extending longitudinally vertically therethrough;
      b. a second strut means spatially disposed from said first strut means and defining a second slot means extending longitudinally therethrough;
C. a drive means being longitudinally extendible and retractable and being attached to said transport carriage assembly and attached to said parallel swing assembly and extending therebetween, said parallel swing assembly movable to a tank lifted position responsive to extending movement of said drive means, said parallel swing assembly movable to a tank lowered position responsive to retracting movement of said drive means;
D. a tank retaining bracket means pivotally attached with respect to said bracket end of said parallel swing assembly, said tank retaining bracket means defining a tank receiving zone thereadjacent extending therealong adapted to receive a tank for selective retaining thereof therewithin with respect to said tank retaining bracket means, said tank retaining bracket means including;
   (1) an upper securement means attached with respect to said parallel swing assembly;
   (2) a lower securement means movably attached with respect to said first strut means and said second strut means of said parallel swing assembly at a location below said upper securement means, said lower securement means including a lower securement foot positioned below said tank receiving zone to facilitate supporting of a tank thereabove which is selectively retained within tank receiving zone, said lower securement means being vertically slideable with respect to said parallel swing assembly while supporting of a tank positioned within said tank receiving zone thereabove;

E. a tank securement apparatus attached to said tank retaining bracket means adjacent said tank receiving zone defined therewithin and selectively engageable with respect to a tank for retaining thereof in position adjacent said tank retaining bracket means within said tank receiving zone positioned thereadjacent; and G. a sliding engagement means being unpowered and operative to slideably engage said lower securement means of said tank retaining bracket means with respect to said first slot means of said first strut means and with respect to said second slot means of said second strut means to facilitate unpowered movement of a tank mounted within said tank receiving zone and said lower securement means relative to said bracket end of said parallel swing assembly to facilitate movement of said tank retaining bracket means into engagement with the environment substrate therebeneath.

2. A tank lifting and handling apparatus for moving a tank between an elevated tank lifted position and a tank lower position in resting abutment with an environmental substrate therebeneath as defined in claim 1 wherein said parallel swing assembly includes:

A. a first parallel swing brace defining a first support end which is pivotally attached to said vertical beam means, said first parallel swing brace further defining a first bracket end spatially disposed outwardly from said first support end thereof;

B. a second parallel swing brace defining a second support end which is pivotally attached to said vertical beam means at a position spatially disposed below the position of pivotal attachment of said first parallel swing brace with respect thereto, said second parallel swing brace further defining a second bracket end spatially disposed outwardly from said second support end thereof; and C. a mounting frame pivotally attached with respect to said first bracket end of said first parallel swing bracket, said mounting frame also being pivotally attached with respect to said second bracket end of said second parallel swing brace at a position thereon spatially disposed below the position of pivotal attachment of said first parallel swing brace thereto.

3. A tank lifting and handling apparatus for moving a tank between an elevated tank lifted position and a tank lower position in resting abutment with an environmental substrate therebeneath as defined in claim 2 wherein said vertical beam means and said mounting frame are both oriented approximately vertically parallel with respect to one another and wherein said first parallel swing brace and said second parallel swing brace extend approximately parallel with respect to one another therebetween in order to maintain said mounting frame and any tank retained within said tank receiving zone oriented vertically during powered movement thereof between said tank lifted position and said tank lowered position.

4. A tank lifting and handling apparatus for moving a tank between an elevated tank lifted position and a tank lower position in resting abutment with an environmental substrate therebeneath as defined in claim 1 wherein said sliding engagement means includes:

A. a first stud means extending through said lower securement means and through said first slot means of said first strut means to facilitate engagement between said lower securement means and said first strut means;

B. a first locking nut means engageable with respect to said first stud means for maintaining positioning thereof extending through said lower securement means and said first slot means;

C. a first inner collar means positioned extending around said first stud means at a location within said first slot means, said first inner collar means being smaller than said first slot means to facilitate vertical sliding engagement between said tank retaining bracket and said first strut means of said parallel swing assembly;

D. a first outer collar means positioned extending around said first stud means at a location laterally adjacent said first slot means between said first strut means of said parallel swing assembly and said first stud means to maintain a minimum lateral spacing therebetween to facilitate vertical relative movement therebetween;

E. a second stud means extending through said lower securement means and through said second slot means of said second strut means to facilitate engagement between said lower securement means and said second strut means;

F. a second locking nut means engageable with respect to said second stud means for maintaining positioning thereof extending through said lower securement means and said second slot means;

G. a second inner collar means positioned extending around said second stud means at a location within said second slot means, said second inner collar means being smaller than said second slot means to facilitate vertical sliding engagement between said tank retaining bracket and said second stud means of said parallel swing assembly; and H. a second outer collar means positioned extending around said second stud means at a location laterally adjacent said second slot means between said second strut means of said parallel swing assembly and said second stud means to maintain a minimum lateral spacing therebetween to facilitate vertical relative movement therebetween.

5. A tank lifting and handling apparatus for moving a tank between an elevated tank lifted position and a tank lower position in resting abutment with an environmental substrate therebeneath as defined in claim 4 wherein said first slot means and said second slot means are each elongated in a vertical direction to facilitate vertical sliding movement of said lower securement means with respect to said parallel swing assembly.

6. A tank lifting and handling apparatus for moving a tank between an elevated tank lifted position and a tank lower position in resting abutment with an environmental substrate therebeneath as defined in claim 4 wherein said sliding engagement means is adjustable to vary the tightness of sliding frictional engagement of said lower securement means of said tank retaining bracket with respect to said first slot means of said first strut means and with respect to said second slot means of said second strut means by varying the tightness of engagement between said first locking nut means and said first stud means and the tightness of engagement between said second locking nut means and said second stud means to vary the frictional engagement between said first inner collar means and said first outer collar means with respect to said first slot means and to vary the frictional engagement between said second inner collar means and said second outer collar means with respect to said second slot means.

7. A tank lifting and handling apparatus for moving a tank between an elevated tank lifted position and a tank lower position in resting abutment with an environmental substrate therebeneath as defined in claim 1 wherein said parallel swing assembly defines slot means extending therethrough which is elongated vertically.

8. A tank lifting and handling apparatus for moving a tank between an elevated tank lifted position and a tank lower position in resting abutment with an environmental substrate therebeneath as defined in claim 7 further comprising a sliding engagement means operative to slideably engage said lower securement means of said tank retaining bracket means with respect to said slot means defined in said parallel swing assembly.

9. A tank lifting and handling apparatus for moving a tank between an elevated tank lifted position and a tank lower position in resting abutment with an environmental substrate therebeneath as defined in claim 8 wherein said sliding engagement means includes:

A. a stud means extending through said tank retaining bracket and through said slot means; and B. a nut means securable to said stud means to maintain slideably movable engagement between said tank retaining bracket and said parallel swing assembly.

10. A tank lifting and handling apparatus for moving a tank between an elevated tank lifted position and a tank lower position in resting abutment with an environmental substrate therebeneath as defined in claim 9 wherein said sliding engagement means further includes an inner collar means positioned extending around said stud means at a location within said slot means, said inner collar means being smaller than said slot means to facilitate sliding movement therebetween while facilitating engagement between said tank retaining bracket and said parallel swing assembly.

11. A tank lifting and handling apparatus for moving a tank between an elevated tank lifted position and a tank lower position in resting abutment with an environmental substrate therebeneath as defined in claim 10 wherein said sliding engagement means further includes an outer collar means positioned extending around said stud means at a location laterally adjacent said slot means between said parallel swing assembly and said stud means to maintain a minimum lateral spacing therebetween to facilitate vertical relative movement therebetween.

12. A tank lifting and handling apparatus for moving a tank between an elevated tank lifted position and a tank lower position in resting abutment with an environmental substrate therebeneath as defined in claim 1 wherein said lower securement means and said lower securement foot are formed as a single integral member to facilitate supporting a tank positioned within said tank receiving zone, and wherein said lower foot extends outwardly from said lower securement means to support a tank thereupon and is adapted to contact the environmental substrate thereadjacent responsive to downwardly directed movement of said lower securement means to support a tank positioned in said tank receiving zone above said lower securement foot.

13. A tank lifting and handling apparatus for moving a tank between an elevated tank lifted position and a tank lower position in resting abutment with an environmental substrate therebeneath as defined in claim 1 wherein said tank securement apparatus includes a belt means and a buckle attached directly to said parallel swing assembly, and wherein said belt means is adjustably securable with respect to said buckle means to to facilitate use thereof with tanks having various sizes and configurations.

14. A tank lifting and handling apparatus for moving a tank between an elevated tank lifted position and a tank lower position in resting abutment with an environmental substrate therebeneath as defined in claim 1 wherein said transport carriage assembly includes a reinforcement cross member secured to said vertical beam means and also secured to said main transport frame and extending therebetween for enhancing overall structural strength of said transport carriage assembly.

15. A tank lifting and handling apparatus for moving a tank between an elevated tank lifted position and a tank lower position in resting abutment with an environmental substrate therebeneath as defined in claim 14 wherein said drive means is attached with respect to said reinforcement cross member and is attached with respect to said parallel swing assembly and extends therebetween to facilitate powering of movement of said parallel swing assembly between said tank lifted position and said tank lowered position.

16. A tank lifting and handling apparatus for moving a tank between an elevated tank lifted position and a tank lower position in resting abutment with an environmental substrate therebeneath as defined in claim 1 wherein said transport carriage assembly includes a roller means which is mounted in said transport carriage assembly and extends downwardly therefrom to facilitate moving thereof.

17. A tank lifting and handling apparatus for moving a tank between an elevated tank lifted position and a tank lower position in resting abutment with an environmental substrate therebeneath as defined in claim 1 wherein said sliding engagement means is adjustable to vary the tightness of sliding engagement of said lower securement means of said tank retaining bracket with respect to said first slot means of said first strut means and of said second slot means of said second strut means.

* * * * *